Sept. 29, 1942.                H. PFLEUMER                2,297,022
                    METHOD OF MAKING CLOSED CELL RUBBER
                            Filed Aug. 2, 1940
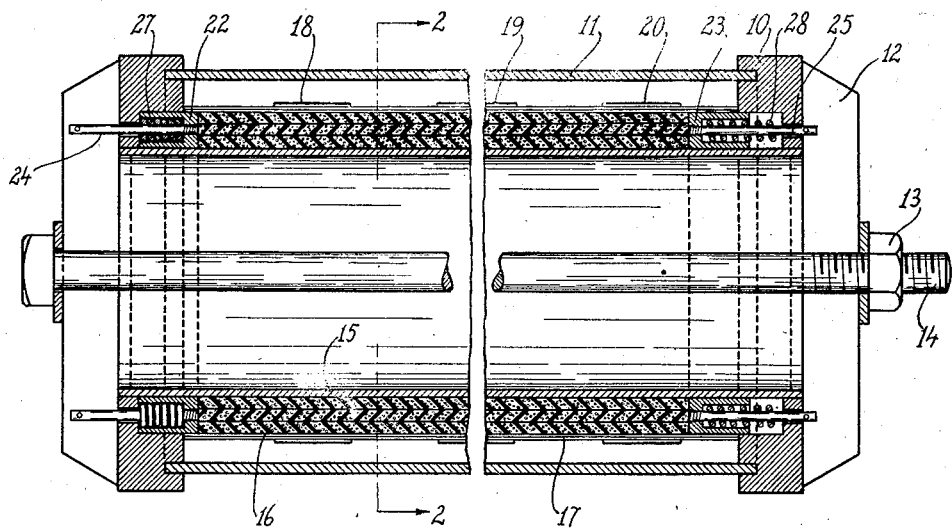
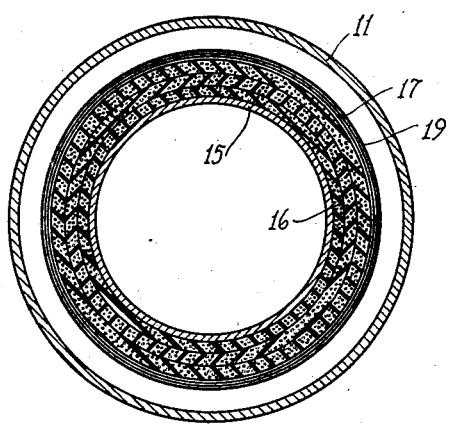 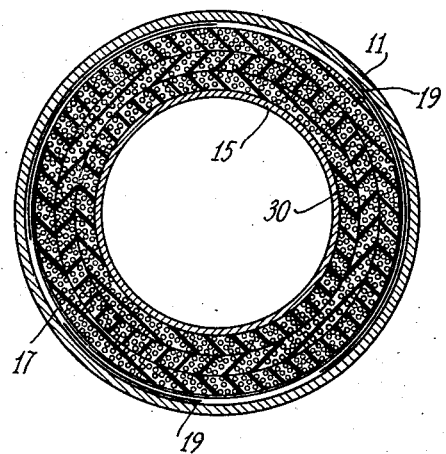
INVENTOR.
Hans Pfleumer
BY
ATTORNEY Patented Sept. 29, 1942

2,297,022

UNITED STATES PATENT OFFICE 2,297,022

METHOD OF MAKING CLOSED CELL RUBBER

Hans Pfleumer, New Brunswick, N. J., assignor to Rubatex Products, Inc., New York, N. Y., a corporation of Delaware Application August 2, 1940, Serial No. 349,548

8 Claims. (Cl. 18—53)

My invention relates to a novel process of manufacturing closed cell gas expanded rubber and more particularly my invention relates to a method in which I impart a precure to a sheet of rubber containing a chemical blowing agent in a cylindrical container, causing decomposition of the chemical into gas while preventing substantial expansion of the rubber.

In the manufacture of closed cell gas expanded rubber by the chemical blow process, that is, the process in which there is admixed with rubber a chemical or chemicals adapted to evolve gas, it is necessary that the rubber be set up or partially vulcanized to prevent the gas evolved from the chemical from permeating throughout the mass to form channels which would make a sponge rubber. One method of forming closed cells in rubber comprises the steps of confining the rubber against substantial expansion while heating the rubber to cause evolution of gas and partially vulcanizing the rubber before releasing it from such confinement.

However, it has been found that there is very high pressure exerted by the rubber when so confined. This pressure is the result of the material expansion of rubber upon being heated (the coefficient of expansion of rubber being relatively high). Additionally considerable pressure is developed by the gas evolved from the decomposing blowing agent within the rubber. This has necessitated the provision of extra strong and heavy platen presses which are obviously quite expensive. Inasmuch as closed cell gas expanded rubber is a product which is produced in great volume for many different purposes, it can be seen that it is preeminently desirable that high apparatus costs, which result in increased overhead, be kept down.

Accordingly, I have provided a novel process in which I provide a cylindrical mold in which is effected the abovementioned precure while permitting the rubber a substantial longitudinal expansion in order to reduce the pressure and induce the formation of cell-tight structure.

With the rubber there is first homogeneously admixed the necessary chemical or chemicals adapted to evolve a gas on decomposition or reaction and the so mixed rubber is shaped into sheet form. In such sheet form the rubber is placed into the cylindrical mold which may generally take the form of two concentric tubes, the inner tube being placed within the outer tube but being spaced therefrom. The rubber sheet is wrapped about the inner core of the mold, several layers of metal sheet are then wrapped about it and bound up with straps, adapted to break under a predetermined strain.

The rubber is then heated. This acts to cause a partial expansion of the rubber by reason of the effect of heat upon the rubber itself. This expansion may amount to 5% linear and is taken care of by allowing limited longitudinal expansion. Further heating acts to cause evolution of gas from the blowing agent, whereupon the rubber expands longitudinally until no more space is available.

The rubber is confined against substantial expansion by the metal sheet wrappings and binding straps.

As more gas is evolved the pressure becomes strong enough to break the binding straps and the metal wrappings slip apart.

At this point the rubber has been sufficiently vulcanized to permit the proper formation of closed gas cells and the precuring of the partially expanded cell rubber continues.

After the proper degree of precure is achieved the mold is cooled somewhat and the closed cell rubber removed and permitted to expand to the full extent, whereupon it is flattened out and finished in plane molds to give the desired shape and cure.

While this procedure is necessary for flat boards, cylindrical cell rubber articles can be finished in the cylindrical mold described.

The process may be used with either hard or soft rubber since in both cases the rubber is suitably flexible in the stage of the preliminary cure. The process may be employed for the preparation of rubber for its ultimate formation into either flat or planular form or non-planular form.

The process above described makes possible the employment of relatively inexpensive molds in the manufacture of closed cell rubber since the process may be carried out in a single molding apparatus and I may employ as the molds for the confinement and cure, metal tube molds concentrically arranged with suitable space therebetween in lieu of the hitherto employed heavy platen presses which have been necessitated because of the pressures involved when a flat sheet is confined between flat surfaces.

In the cylindrical molds I have above described, the strains are equally distributed in all directions on both the outer and inner tubes and because of the minimized stress only a relatively low mold thickness and strength is required in my cylindrical mold.

A further feature of my invention resides in the fact that I have found that when the mold is filled to approximately 70%, that is when the sheet of rubber containing the blowing agent occupies approximately 70% of the space between the walls of the cylindrical mold, then I obtain best results with a minimum of stress without the use of a wrapping or binding for obtaining a partially cured, partially expanded closed cell rubber adapted to be finally heated for final expansion and vulcanization in a second mold.

Accordingly it is the object of my invention to provide a novel process for the confinement against the substantial expansion of rubber containing a chemical blowing agent in a cylindrical mold. It is another object of my invention to provide a novel process in which I confine sheet rubber containing a blowing agent within a mold in the form of concentric tubes so that expansion of the rubber against the mold produces stresses equally in all directions.

It is a further object of my invention to provide a novel apparatus for a pre-treatment of chemically blown closed cell rubber.

It is a further object of my invention to provide a process for the formation of planular or non-planular closed cell gas expanded rubber by precuring said sheets in a cylindrical mold while confining said sheets against substantial expansion.

It is still a further object of my invention to fill a cylindrical mold with sheet rubber containing a chemical blowing agent so that the sheet rubber occupies approximately 70% of the mold and then apply heat to the mold to cause the evolution of the gas from the chemicals contained in the rubber, thus expanding the inflated rubber against the cylindrical molds, precuring the same and developing a closed cell structure.

It is a further object of my invention to provide a novel closed cell gas expanded rubber by controlled expansion.

It is a further object of my invention to provide a novel method of making chemically blown closed cell rubber by securing a predetermined longitudinal and radial expansion.

It is a further object of my invention to provide a novel method of making closed cell rubber in which the rubber is allowed to expand longitudinally to a certain extent during the preliminary heating while it is held against radial expansion until a predetermined internal gas pressure is obtained whereupon limited radial expansion is allowed.

These and further objects of my invention will be apparent from a consideration of the drawing and specific description which follows.

Figure 1 is a cross section and partial perspective of the apparatus in which the process of my invention can be carried out.

Figure 2 is a cross section taken along the line 2—2 of Figure 1 showing the rubber while it is being held against radial expansion by the wrappings which are secured thereabout.

Figure 3 is a cross section similar to Figure 2 showing the rubber during final expansion after the gas pressure internally developed has broken the bands securing the rubber against radial expansion.

Referring now more specifically to Figure 1, I show an autoclave generally denoted as 10 with the cylindrical walls 11. This mold may be a two part or three part cylindrical mold, which mold may be hinged by a hinge member and locked by some suitable locking device; or the outer mold cylinder may consist of three single sections held together in cylindrical shape by several pairs of half clamps. The cylindrical mold I employ readily absorbs a distributed pressure engendered upon the expansion of the cellular rubber.

I have found that since a considerable pressure is exerted by the finally expanding cellular rubber against the side walls 11 of the cylindrical mold that a two part or three part mold of the general shape here shown is particularly efficient for speedy removal of the final product of my invention.

In Figure 1, I show a lid 12 secured on the cylindrical mold by suitable screw locking means 13 mounted on a bar 14. Within the mold I provide a cylinder 15 on which is wrapped rubber sheeting 16 in a plurality of convolutions. The rubber may comprise the following constituents:

| | Parts by weight |
|---|---|
| Rubber, crepe or smoked | 100 |
| Sulphur | 6 |
| Light calcined magnesia | 6 |
| Gilsonite | 25 |
| Diphenyl guanidine | 2 |
| Low melting bituminous substance as asphalt | 25 |

The blowing agent may comprise any suitable chemical or chemicals adapted to evolve gas under decomposition by heat. For example a mix of sodium nitrate and ammonium chloride, diazoaminobenzene, or any similar chemical or chemicals with the properties above set forth may be employed.

In order to provide for a final product which is flexible and soft, the sulphur content, as is known in the art, should be held in a low range. To obtain a hard final product a percentage of sulphur of the order of 40–50% of the rubber is employed.

As stated the rubber mix is formed into sheet form 16 and then wrapped about the cylindrical core mold member 15. About the so wrapped rubber sheets I place securing wrappings 17 comprising several turns of metal sheeting. I secure thereabout the binding straps 18, 19 and 20 which may be adhesive coated paper or any suitable strip material adapted to secure the wrappings 17 against slippage. The binding strap members so described prevent initial radial expansion of the rubber under the heat and gas pressure which is internally developed therein. To provide a yieldable controlled expansion of the rubber in a longitudinal direction I provide ring members 22 and 23 mounted on the pins 24 and 25 and yieldably pressed against the rubber by means of the springs 27 and 28. At 28 I show the ring member in its original extended position with the spring 28 extended.

As heat is supplied through a suitable heating mechanism, such as hot glycerol, steam, electric heating mechanism or the like, the rubber under the influence of the heat and gas pressure of the decomposing chemical blowing agent within it tends to expand, forcing the spring controlled ring member back, and this pressure is illustrated by the ring 22 receded with the spring 27 compressed therein.

The springs in these members are so tensioned as to allow first for the longitudinal expansion of the rubber sheetings without breaking the sheet wrapping. The heating is continued, which continues the evolution of the gas and the expansion of the gas so formed within the rubber until a proper pressure is built up and a proper cell structure is developed in the rubber, whereupon the critical strength limit of the binding straps 18, 19, and 20 is reached. These straps then break allowing the confining metal sheet 16 to slip and the rubber sheets to expand radially. This expansion is more fully shown in Figures 2 and 3, Figure 2 showing the relative size and position of the rubber sheeting before the binding straps break, and Figure 3 showing the expansion and cell enlargement of the rubber sheets after the straps break and the rubber is expanded radially against the cylindrical confining mold. Although considerable pressure is exerted by the radial expansion, it is uniformly distributed over the confining cylindrical mold and such pressure is readily absorbed by the mold.

Usually I correlate the breaking strength of the straps and the heating operation so that the rubber is given a partial cure before its release by the breaking of the straps.

The present process makes possible the formation of closed cell gas expanded rubber without removing the rubber from the original mold into different molds with the attendant problems thereof.

The cellular structure formed according to the present process is superior to the prior processes because of the restricted expansion and because the radial expansion takes place at the optimum predetermined point.

After the radial expansion against the mold takes place, vulcanization by means of heat is continued until a sufficient cure is imparted to the rubber to allow complete expansion.

It is within the purview of my invention to employ a fluid counter pressure in the mold cavity, and this fluid may, for example, be live steam, as a means of heat control and for building up counterpressures to control the step expansion above set forth.

As generally set forth hereinbefore, an alternative method comprises inserting in the mold, rubber containing a chemical blowing agent so that the mold is approximately 70% filled. The mold is then closed and heated. The heat causes decomposition of the blowing agent whereupon the rubber expands the 30% to fill the mold. Further expansion is prevented by the mold and heating is continued until the gassed rubber is partially cured. Subsequently the rubber is removed and finally cured and expanded by heat in another mold.

I claim:

1. A method of making closed cell gas expanded rubber which comprises mixing rubber with a chemical blowing agent, confining the rubber by binding straps, heating the bound rubber to cause decomposition of the chemical blowing agent contained therein, the binding preventing radial expansion until a predetermined internal pressure is developed, and continuing the heating until sufficient pressure is developed to break said binding.

2. A method of making closed cell gas expanded rubber which comprises mixing rubber with a chemical blowing agent, confining the rubber by binding straps, and placing the same within a mold heating the bound rubber to cause decomposition of the chemical blowing agent contained therein, the binding preventing radial expansion until a predetermined internal pressure is developed, continuing the heating until sufficient pressure is developed to break said binding, and to expand said sheet against the mold surface, and heating said expanded rubber to complete the evolution of gas from the chemical blowing agent contained therein and to complete the vulcanization.

3. A method of making closed cell gas expanded rubber which comprises mixing rubber with a chemical blowing agent, confining the rubber by binding straps, and placing the same within a substantially cylindrical mold heating the bound rubber to cause decomposition of the chemical blowing agent contained therein, the binding preventing radial expansion until a predetermined internal pressure is developed, continuing the heating until sufficient pressure is developed to break said binding, and to expand said sheet against the substantially cylindrical surface of the mold, and heating said expanded rubber to complete the evolution of gas from the chemical blowing agent contained therein and to complete the vulcanization.

4. A method of making closed cell expanded rubber which comprises mixing rubber with a chemical blowing agent, confining the rubber by binding straps and placing the same within a mold the walls of which are spaced from the rubber, heating the bound rubber to cause decomposition of the chemical blowing agent contained therein and partial vulcanization of the rubber, the binding preventing radial expansion until a predetermined internal pressure is developed, continuing the heating until sufficient pressure is developed to break said binding and to expand said sheet against the mold surface spaced from said rubber, and heating said expanded rubber to complete the evolution of gas from the chemical blowing agent contained therein and to complete the vulcanization.

5. A method of making closed cell gas expanded rubber which comprises mixing rubber with a chemical blowing agent, forming the so-mixed rubber into sheet form, wrapping the sheet around a suitable mold member, confining the wrapped sheet by binding straps. heating the bound rubber to cause decomposition of the chemical blowing agent contained therein and partial vulcanization of the rubber, the binding preventing radial expansion until a predetermined internal pressure is developed, and continuing the heating until sufficient pressure is developed to break said binding.

6. A method of making closed cell gas expanded rubber which comprises mixing rubber with a chemical blowing agent, forming the so-mixed rubber into sheet form, wrapping the sheet around a tube, confining the wrapped sheet by binding straps and placing an end of said sheet adjacent a resilient member, heating the bound rubber to cause decomposition of the chemical blowing agent contained therein and partial vulcanization of the rubber, the binding preventing radial expansion until a predetermined internal pressure is developed, said sheet expanding longitudinally against the resilient member, and continuing the heating until sufficient pressure is developed to break said binding.

7. A method of making closed cell gas expanded rubber which comprises mixing rubber with a chemical blowing agent, forming the so-mixed rubber into sheet form, wrapping the sheet around a suitable mold member, confining the wrapped sheet by binding straps and placing the same within another mold the walls of which are spaced from the rubber, heating the bound rubber to cause decomposition of the chemical blowing agent contained therein and partial vulcanization of the rubber, the binding preventing radial expansion until a predetermined internal pressure is developed, continuing the heating until sufficient pressure is developed to break said binding and to expand said sheet against the mold surface spaced from said confined rubber sheet, and heating said expanded rubber to complete the evolution of gas from the chemical blowing agent contained therein and to complete the vulcanization.

8. A method of making closed cell gas expanded rubber which comprises mixing rubber with a chemical blowing agent, forming the so-mixed rubber into sheet form, wrapping the sheet around a tube, confining the wrapped sheet by binding straps and placing an end of said sheet adjacent a resilient member, heating the bound rubber to cause decomposition of the chemical blowing agent contained therein and partial vulcanization of the rubber, the binding preventing radial expansion until a predetermined internal pressure is developed, said sheet expanding longitudinally against said resilient member, continuing the heating until sufficient pressure is developed to break said binding, expanding said sheet against a substantially cylindrical surface spaced from said confined rubber sheet, and heating said expanded rubber to complete the evolution of gas from the chemical blowing agent contained therein and to complete the vulcanization.

HANS PFLEUMER.